(12) United States Patent
Parker

(10) Patent No.: US 10,044,844 B2
(45) Date of Patent: Aug. 7, 2018

(54) CHILD/USER MOBILE DEVICE MANAGER

(71) Applicant: Stephen Brian Parker, McLean, VA (US)

(72) Inventor: Stephen Brian Parker, McLean, VA (US)

(*) Notice: Subject to any disclaimer, the term of this patent is extended or adjusted under 35 U.S.C. 154(b) by 444 days.

(21) Appl. No.: 13/716,738

(22) Filed: Dec. 17, 2012

(65) Prior Publication Data

US 2014/0171059 A1 Jun. 19, 2014

(51) Int. Cl.
*H04M 1/2745* (2006.01)
*H04M 1/725* (2006.01)
*H04W 52/02* (2009.01)

(52) U.S. Cl.
CPC . *H04M 1/274533* (2013.01); *H04M 1/72563* (2013.01); *H04W 52/0235* (2013.01); *Y02D 70/00* (2018.01); *Y02D 70/1224* (2018.01); *Y02D 70/142* (2018.01); *Y02D 70/144* (2018.01); *Y02D 70/164* (2018.01); *Y02D 70/26* (2018.01)

(58) Field of Classification Search
USPC .............................. 455/419, 550.1
See application file for complete search history.

(56) References Cited

U.S. PATENT DOCUMENTS

| | | | | |
|---|---|---|---|---|
| 7,200,416 | B2* | 4/2007 | Aisenberg | H04M 1/0279 379/433.06 |
| 7,983,718 | B1* | 7/2011 | Roka | H04M 1/27455 348/14.02 |
| 2002/0098874 | A1* | 7/2002 | Zirul | H04M 1/663 455/564 |
| 2004/0132480 | A1* | 7/2004 | Parker et al. | 455/550.1 |
| 2007/0157089 | A1* | 7/2007 | Van Os | G06F 3/04817 715/702 |

OTHER PUBLICATIONS

Quick Contacts by Lee, updated on Sep. 8, 2012.*

* cited by examiner

*Primary Examiner* — Daniel Lai
(74) *Attorney, Agent, or Firm* — Westerman, Hattori, Daniels & Adrian, LLP

(57) ABSTRACT

According to some embodiments, a wireless child phone includes: a) a handheld phone unit with a touch screen type user interface; b) the wireless phone being configured to make calls to only a preset set of callees, and wherein the child phone is adaptable to modify the preset set of callees by an administrator such as to present a modified user interface for a user based on the number of callees in the preset set of callees; c) the child phone being configured to display on the touch screen dialing keys comprising icons or regions for enabling a call to be automatically directed to a callee upon selecting a respective icon or region, wherein the child phone is configured such that upon pressing a respective icon or region, a call is automatically directed to a respective one of the preset set of callees.

19 Claims, 10 Drawing Sheets

Enter Number of Callees: 2

| NAME (displayed) | NUMBER (displayed) | PHOTO (displayed) |
|---|---|---|
| MOM | 703-555-1212 | |
| DAD | 703-555-1234 | |
| BUCKY | 123-234-456 | |

FIG. 6(A)

| Screen Lock: | Enable | Code |
|---|---|---|
| | Y | 1378 |

FIG. 6(B)

Enter Number of Callees: 2

| NAME (displayed) | NUMBER (displayed) | PHOTO (displayed) |
|---|---|---|
| MOM | 703-555-1212 | |
| DAD | 703-555-1234 | |
| BUCKY | 123-234-456 | |

FIG. 6(C)

Emergency Callees: 1

| NAME (displayed) | NUMBER (displayed) | PHOTO (displayed) | CODE |
|---|---|---|---|
| 911 | 911 | | 1-2-3 |
| POLICE | 703-XXX-XXXX | | 1-2-3 |
| SCHOOL | 703-YYY-YYYY | | none |

Enter Number of Callers: 1

| NAME (displayed) | NUMBER (displayed) | PHOTO (displayed) | AUTO ANSWER: |
|---|---|---|---|
| MOM | 703-555-1212 |  | Enable |
| DAD | 703-555-1234 |  | Enable |
|  |  |  |  |

Enter Calling Methods:   SKYPE: [Y]   PHONE: [N]

Enter Receiving Methods: SKYPE: [Y]   PHONE: [Y]

Remote Control Features:

Allow Web control: [Y]

Allow Telephone control: [Y]

Auto Audio Pick Up:

| Enable | Name/Number | Code |
|--------|-------------|------|
| Y | MOM | |
| Y | 703-POLICE | |

Turn On/Off Telephone: [TURN OFF]

Remotely Change Callees: [Y]

Remotely Change Callers: [Y]

FIG. 6(J)

Remote Listening:

| Enable | Name/Number | Code |
|--------|-------------|------|
| Y | MOM | 123 |
| N | 703-POLICE | 123 |

FIG. 6(K)

Remote Viewing

| Enable | Name/Number | Code |
|--------|-------------|------|
| Y | MOM | 234 |
| N | 703-POLICE | 234 |

FIG. 6(L)

Send a Picture:

| Enable | Name/Number | Code |
|--------|-------------|------|
| Y | MOM | 345 |
| N | 703-POLICE | 345 |

US 10,044,844 B2

CHILD/USER MOBILE DEVICE MANAGER

PRIORITY

The present application claims priority to and is a non-provisional of both (1) U.S. Provisional Application No. 61/576,344 entitled Improved Child/User Mobile Device Manager filed on Dec. 15, 2011 to S. Parker and (2) U.S. Provisional Application No. 61/584,255 entitled Improved Mobile Device with Improved Mobile Applications filed on Jan. 8, 2012 to S. Parker, the entire disclosures of which two applications are incorporated herein by reference as though recited herein in full, including each and every part of said applications.

BACKGROUND

The present application improves upon prior invention as taught and described in U.S. patent application Ser. No. 10/636,916, issuing as U.S. Pat. No. 8,086,283 on Dec. 27, 2011 to Parker, et al., filed on Aug. 8, 2003, 2033, the entire contents of which is incorporated herein by reference. The disclosure of said '916 patent is also incorporated herein below in the following paragraphs.

The present application also incorporates herein by reference the entire disclosure of U.S. Provisional Application No. 60/401,748 filed on Aug. 8, 2002. In addition, the entire U.S. Application 2010/0235881 published on Sep. 16, 2010 is incorporated herein by reference as background discussion. That application is incorporated as an illustrative example of cellular phone architecture that can be used for some embodiments, as well as illustrative network architectures.

In the following paragraphs incorporated herein in the immediate paragraphs below in this background section contain direct incorporation of all language of said '916 patent, and, thus, should be understood as in that context. For example, in such paragraphs, the figures referred to are the figures from said '916 patent, which are incorporated by reference herein.

Wireless Child Communication Device

The present invention relates to improvements in wireless communications, such as telephones. The preferred embodiments are explained in the attachments. Embodiments of the invention may be constructed using known technologies, such as various technologies employed in existing telephone systems, such as that by SPRINT, QUALCOM, PALM and many other wireless telephone, wireless Personal Data Assistants (PDAs) and the like. In some embodiments, technology employed in the JPHONE wireless devices can be employed—e.g., such devices having recently become popular in JAPAN, for example. In that regard, some illustrative devices are shown in the attached documents (see above Provisional Application). The present invention may employ technology within such and other devices, such as underlying communications structures and such as various features disclosed in such materials.

Description Related to, e.g., FIG. 1

FIG. 1 shows a front view of a wireless phone according to some illustrative embodiments. In the illustrated, a plurality of keys (six in the illustrated) are shown. Here, the keys are limited and programmed to call a specific individual and/or a specific group of individuals (i.e., conference-calling or multiway calls—such as, e.g., shown at "both" which can be, e.g.! a conference call to both the "mom" and "dad" or the like). Preferably, the keys have pictures such as photographs designating callee to facilitate use by non-reading children.

In some examples, pictures can be located physically on the keys and/or can be displayed on a screen. In some embodiments, the keys can be provided on a touch screen in which a user can physically to an image on the screen. In some embodiments, images on the screen can be replaced, such as, e.g., by taking a digital photograph with the camera and storing the same for display at a location on the touch screen.

Description Related to, e.g., FIG. 2

FIG. 2 shows another of a wireless phone with a display screen located proximate keys of the phone. For example, the display can be used to display a picture to be shown. In addition, the display can be used as a video phone display. In addition, the display can be used to display a digitally stored picture upon clicking a button or key—such as, e.g., displaying an entered electronic photograph to help a user identify a key to push.

In some embodiments, a common telephone (e.g., having a common key pad with digits 0-9 and * and # keys could be modified to incorporate features described herein. For example, a cover plate can be provided over a common phone that covers one or more button to present only buttons or keys for use by child. This could even be applied to a normal phone so as to reveal, for example, only a few keys. In this manner, some embodiments of the invention could be employed by readily modifying existing phones.

Description Related to, e.g., FIG. 3

FIG. 3 shows embodiments including a camera lens, a display and/or video portion for visual display of digitally stored images and/or video, a plurality of keys (six in the illustrated), and a protective rubber or foam rubber or the like shroud around a perimeter to protect the telephone upon dropping the same. In some preferred embodiments, the rubber can be a substantial thickness in proportion to the dimension of the telephone, such as, e.g., about the thickness shown.

Features in Illustrative Embodiments

Emergency Key Function:

In some illustrative embodiments, one key labeled "emergency" can be set to call a preset emergency number. In some embodiments, the number called can be a call to 911. In some embodiments, the number called can be a conference call to Mom and Dad. And, in some embodiments, if no answer is made by either Mom or Dad, the call will preferably be rolled over or forwarded to 911 as back-up (e.g., within a preset time as would be understood based on this disclosure). In some embodiments, this key can establish a conference call to Mom and Dad and other(s) and, preferably, if there is no answer by any, it can be made to call to 911. In some embodiments, the call can be a conference call to each of Mom and Dad and 911 (in some embodiments, others could be conferenced in too).

Conference calls to 911 and to other individuals could help ensure that improper calls to 911 are avoided and/or thwarted. In some embodiments, a parent or the like could be able to remotely control the telephone (e.g., by pressing a particular key on the parent's phone during a call to cause the telephone to perform a function, such as, e.g.: a) to automatically disconnect [e.g., which a call is wrongly made to 911], b) to send a digital photograph [e.g., to the parent's phone and/or to a number, URL or email address, such as, e.g., if the phone is web enabled pre-identified and/or programmed by keys at the parent's phone and/or via an internet web site or the like], c) or other Junction.]).

In some embodiments, such as, e.g., addressed below, a central service can establish an independent emergency number that can be used to pre-screen emergency calls from the child phone. For example, this could be a telephone number established by the issuer of the child phone. In some embodiments, this number could even be a confidential number that is merely stored in the child's phone so as to inhibit contact be other individuals and limit undesired use other than with the child's phone.

Camera Function:

In some embodiments, a camera function can be provided. In some embodiments, the phone itself can include a key for pressing to send a picture. In some embodiments, the picture can sent via e-mail and/or one can otherwise transmit a picture. In some embodiments, this can enable sending of picture to, e.g., Mom, Dad, Other and/or Emergency e-mail addresses. For example, in some embodiments, a user (e.g., a child) can press a picture button and have a picture in que and then sent upon clicking a button for a respective callee (e.g. Mom, Dad, Other, and/or Emergency callees). In some embodiments, Mom, Dad and/other and/or Emergency System Personel (e.g., if a system is set up to monitor, e.g., the child using the phone) can send A) automatic e-mail photo request whereby the child's phone is called and a photo is automatically sent to requested location.

Calling/Receiving Features:

In preferred embodiments, the child phone can receive calls only by: Mom, Dad, Other and/or Emergency callers. As would be understood based on this disclosure, by way of example, a caller ID function could be used that merely allows calls from a few preset numbers applicable to specific callees. In some examples, a system can be established to help locate children or the like (e.g., such as, e.g., which may manage a large number of child phone users or all child phone users simultaneously). In some cases, the phone can have buttons flash (or otherwise be visibly indicated) for who is calling and the child can readily press a respective button to answer the phone. In some cases, the child can readily answer by pressing a single answer button (preferably. the identity of the caller will be visible identified to the child).

In some cases, the apparatus can have an automatic answer at the child's phone. Preferably, in these instances, the child phone will have a speaker or page feature so that the callee can page thru such that parent or the like is audible to child without child answering.

Preferably, a parent or the like controls child's phone unit, such as by entering information on a website and/or even by calling the child's phone directly and entering a password and getting menu options. For instance, the parent and/or the like can preferably change numbers that the child's phone wourd call for various key entries—such as, e.g., MOM, DAD, OTHER, ETC. (e.g., this would be unnoticed by child that would reach parent no matter what). Also, preferably a parent could change buttons to generate multiple calls (i.e., conference multiple numbers) to reach the parent, such as by calling home, office, cell phone and/or other numbers concurrently to attempt to reach that parent.

Thus, the cell phone would preferably be remotely programmable. In some embodiments, the child's phone could be programmed directly (such as by including a removable plate that covers a key pad or the like). However, it is preferably remotely programmed.

Description Related to, e.g., FIG. 4

In some embodiments, the child phone can have a cover or lid. Preferably, upon opening the cover, the phone can power to an active mode. In some embodiments, the child can then verbally call by saying, e.g., a parents name.

In some embodiments, a call will automatically be made upon opening the cover or lid. In some embodiments, a call will automatically be made to one individual or group, unless within a predetermined time (e.g., 5-10 seconds) entry is made to make a call to another individual or group. For example, if a child opens the phone, a call could automatically be directed to a MOM and/or DAD, unless the child identifies another particular number.

In some embodiments, the parent can select one or more "other" key for the child to call. Here, for example, a child may be able to call a care giver, a friend of the child (perhaps on another child 'phone), and/or any other desired individual.

Preferably, the child will have a small number of "other" callee keys (such as, e.g., only one key as shown in some of the figures).

In some embodiments, a necklace can be used to support the phone so as to rest or attach to a child's chest region facing outward in normal use. In other embodiments, the phone can include a holder that is clipped to a child's clothing and the phone can be removed therefrom. In some embodiments, the phone is on a short retract-able chord connected to the holder. The chord is preferably too short to extend around a child's neck, but long enough to bring phone into view. In some embodiments, the phone includes a camera facing outwards in normal use (e.g., when worn). In some embodiments, the phone can be programmed to send images to another phone or to a server (such as, e.g., a server communicating via the Internet) or the like (such as when requested via a parent's phone or the like).

In some embodiments, the camera lens is mounted in normal use on a child so as to face outward and thus provide outward images. In some embodiments, the lid includes a window or opening to enable camera to view therethrough. In some embodiments, when a child picks up the phone during use, the camera will face the child and thus take images of the child's face. In some embodiments, the camera can provide a wide angle image (or a wide angle image lens can be included) to ensure a wide view for discerning environment. The wide view is preferably over 90 degrees and more preferably over 120 degrees and more preferably near 180 degrees or more (possibly over 270 degrees for example) in one or preferably in two coordinate directions. While a wide angle image may be undesirable in other contexts since it may not create an aesthetically pleasant image, it can be advantageous as a monitoring tool.

Known Wireless Communications:

As would be understood based on this disclosure, the child phone would include features inherent in wireless phone technology, such as, e.g., receiving modules, transmission modules, processors, etc. Embodiments of the invention can include, e.g., communications components and/or features such as, e.g., within any of the following U.S. patents, the entire disclosures of which are incorporated herein by reference: U.S. Pat. Nos. 6,603,981; 6,597,905;

6,587,684; 6,587,679; 6,584,327; 6,580,927; 6,577,861; 6,529,743; 6,522,879; 6,519,480; 6,510,324; 6,498,938; 6,498,930; 6,496,691; 6,487,422; 6,487,401; 6,473,610; 6,466,800; 6,466,796; 6,453,182; 6,449,483; 6,434,403; 6,434,365; 6,421,546; 6,418,224; 6,415,142; 6,411,802; 6,411,632; 6,405,056; 6,405,031; 6,405,029; 6,400,967; 6,400,964; 6,397,084; 6,393,269; 6,382,507; 6,381,470; 6,377,822; 6,377,798; 6,366,568; 6,356,752; 6,356,538; 6,351,629; 6,334,054; 6,332,084; 6,327,476; 6,311,071; 6,308,053; 6,298,250; 6,292,675; 6,292,674; 6,292,662; 6,282,416; 6,272,327; 6,266,411; 6,256,516; 6,249,684; 6,246,868; 6,243,593; 6,236,857; 6,236,326; 6,233,337; 6,230,003; 6,223,021; 6,216,000; 6,212,403; 6,212,398; 6,195,558; 6,195,542; 6,195,541; 6,195,535; 6,188,888; 6,188,875; 6,173,195; 6,169,891; 6,163,703; 6,163,682; 6,151,510; 6,151,503; 6,149,353; 6,144,847; 6,144,840; 6,141,570; 6,138,036; 6,138,016; 6,138,008; 6,134,421; 6,131,028; 6,128,515; 6,128,475; 6,125,287; 6,118,981; 6,115,612; 6,115,598; 6,115,412; 6,101,401; 6,091,965; 6,091,947; 6,085,109 and 6,073,034.

BRIEF DESCRIPTION OF THE FIGURES

The preferred embodiments of the invention are described in relation to some preferred embodiments which are shown by way of example and not restriction in the following figures, in which.

DETAILED DESCRIPTION OF THE PREFERRED EMBODIMENTS

Figure 1:
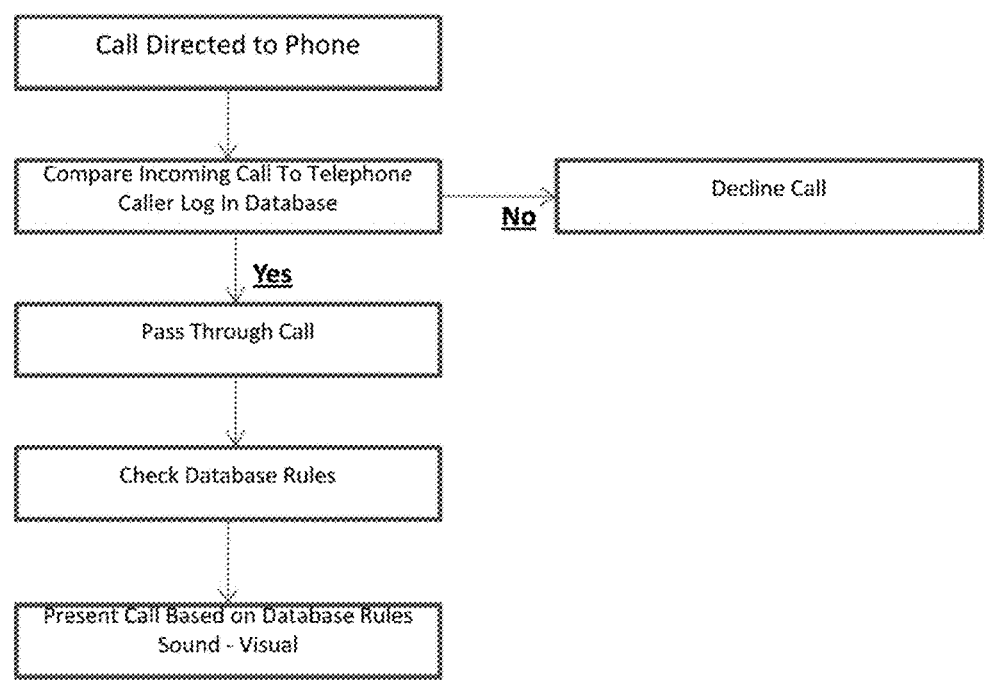
FIG. 1 is a flow diagram for processing caller telephone calls to the child/user device according to some embodiments.

Smart Phone Environment—Touch Screen and 3rd Party Application Software

In the preferred embodiments, a cell phone having functionality as described in said '916 application, i.e., part B, is constructed based on a smart phone having a touch screen interface, such as, e.g., an iPhone™, by Microsoft (see, e.g., part C), and/or an Android™ by Motorola and/or another similar device. Among other things, it is desired to apply functionality of the '916 patent, with improvements as described herein in the environment of a cell phone having the ready ability to include third party application software, such as, e.g., with the iPhone and Android, etc., and to have a cell phone with an adaptable touch screen interface. Although some preferred embodiments pertains to implementations on phones that only include a touch screen interface, in some embodiments, the phone can include another interface, such as, e.g., a common key pad (that is, a common physical key pad having mechanical dialing keys) having common keys 0-9 as known in the art. Additionally, in some embodiments, a common QUERTY key pad can be included (that is, a common physical key pad having mechanical dialing keys with all of the letters of the alphabet similar to a common BLACKBERRY™ device. However, to avoid confusion for child/users, the device preferably does not have such common key "pads"—i.e., does not have common mechanical telephone key "pad" or a common mechanical QWERTY key "pad." In embodiments, where such a mechanical "pad" is provided, such could perhaps be lockable beneath a mechanical "cover" in some implementations.

As such, according to some preferred embodiments, by inclusion of software into, e.g., an iPhone, the iPhone can be adapted to, e.g., present a limited number of push button or key locations for a user for dialing. Moreover, the iPhone can be adapted to create other functionality as set forth in said '916 Patent.

Accordingly, in some preferred embodiments, an application (herein, referred to as MOBILEFREELY™) can be created that is downloaded to, e.g., an iPhone, which, when activated (i.e., run) will cause the iPhone to operate as a child-phone similar that described in the '916 patent. Among other things, such an application can be caused to initiate or to run upon pressing of a common application "start" button or icon (and, may require the entry of a password or code if desired), and, most preferably, the application cannot be caused to terminate without taking a specific action, such as, e.g., entry of a password, code or the like to ensure the phones restricted operation for certain users.

Extension of Smart Phone Usage—Personal/Family Market

Among other things, including such a novel MOBILEFREELY application can enable significant increases in sales of iPhones and the like, by opening the market for such phones to younger users. In particular, unique methods of increasing distributions can include:

A. Having parents purchase additional iPhones for under-age children (i.e., that may not be ready for fully functional iPhones) and restricting such iPhone capabilities using said MOBILEFREELY application for a period of time until which the parents may then unrestrict the iPhone (i.e., by removing restrictions of said MOBILEFREELY application) to enable a child to use further iPhone functionalities. Thus, in this manner, sales of iPhones can be increased to a great number of younger users, as parents will not waste money on phones that may not last for a long duration, and will not need to later purchase new phones for the child. Among other things, this eliminates parental concerns for purchasing for underage children.

B. Having parents hand down their older iPhones to their children and restricting such handed down iPhone's capabilities using said MOBILEFREELY application for a period of time until which the parents may then unrestrict the iPhone (i.e., by removing restrictions of said MOBILEFREELY application) to enable a child to use further iPhone functionalities. Among other things, people are often hesitant to purchase new phones or models of phones during a time in which their current phones are "still working" but perhaps having less desirable functionality. For example, a parent might desire to upgrade to an iPhone 4 from an older iPhone. By enabling the parent to hand their iPhone down to their child with restricted functionality, there is a great incentive for the parent to more readily purchase the newer iPhone 4 that the parent desired. Moreover, as the MOBILEFREELY application is desired for restricting capabilities, it also would be very likely that an older phone model would more than accommodate the technical needs of the restricted phone user.

Extension of Smart Phone Usage—School and Business and Other Environments

Among other things, including such a novel MOBILEFREELY application can also enable significant increases of sales of iPhones and the like, by opening the markets for such phones to other environments, such as, e.g., within schools and businesses.

Currently, many schools, and especially, elementary schools and schools for younger children (but, also middle schools, high schools and even colleges and universities) have strict restrictions on allowing cell phones within classrooms and the like. As such, children often are not allowed to even bring such phones to schools or the like.

Similarly, many businesses do not provide cell phones for their employees due to the difficulty to restrict employee usage (i.e., resulting in time wasted and not working and also resulting in phone costs). As such, businesses often opt out of purchasing phones for their employees.

However, by including such a novel MOBILEFREELY application within an iPhone or the like, a school can allow phone use at facilities and a business can provide phones to employees without the prior concerns related to such usages.

Among other things, schools can provide their own applications for downloading, and can restrict phone usage to, e.g.:

a) Parents, School Personnel and/or other Allowed Persons (e.g., A Student Can, e.g., perhaps request permission to, e.g., call a certain friend that is home sick, or another individual, and such can, e.g., perhaps be allowed on a temporary basis or on a limited amount (e.g., one or a few calls permitted). Among other things, this will enable children to get the great safety advantages of cell phones without introducing problems that existed hitherto.

In some embodiments, the cell phones can also be GPS enabled, and the MOBILEFREELY application can include functionality to cause such restrictions to be applied when the phone is within the locality of the school (i.e., such as to limit such restrictions to school vicinity). Alternatively, the MOBILEFREELY application can be adapted to restrict cell phone use and/or to only allow cell phone use when in communication with certain networks within the school, such as, e.g., a school WiFi or Wireless LAN environment.

In some embodiments, the MOBILEFREELY application can also be adapted to restrict the phone usage during certain hours, such as, e.g., moving restrictions outside of school hours, such as, e.g., allowing children to freely call other individuals after school (e.g., to be picked up).

b) Businesses can, e.g., allow employees to call only certain approved telephone numbers (e.g., and an employee can, e.g., perhaps submit a request for permission to, e.g., call other persons as needed). Among other things, this will enable the advantages of facilitating business operations without other prior disadvantages.

Similarly, in some embodiments, the phones can be GPS enabled so as to, e.g., allow or even restrict use when in certain locations. For example, a company may want to restrict phone use to only working matters at work facilities and to allow free usage afterwards. Or, a company may desire to restrict phone usage after work hours so as to avoid extra expenses unrelated to work matters.

Similarly, a business can also potentially use the system to limit or restrict usage on a time basis, such as, e.g., to ensure that a user only uses the phone during certain times.

c) Additionally, the MOBILEFREELY software could also include some safety features which would impart restrictions based on, e.g., the speed of movement of the device, such as, e.g., to prevent employees from using phones for certain activities while driving, to prevent children from using phones while on a bus or even while riding a bicycle or the like.

For example, in some embodiments, "schools" can have apps, including:

1. Kids can take phones to school, but at school hours, phones cannot be used to send texts or to call, except to school selected persons (e.g., parents, school, emergency).
2. Kids can enter number to submit for general approval (e.g., to send homework information to a sick friend) or for real time call approval.

As another example, in some embodiments, a "business" can have apps, including:

1. For work phones, use can be restricted to work related numbers;
2. Employees can enter number to submit for general or real time call approval;
3. Employees can have use restricted to working hours (i.e., cheaper—not enabling after hour use).

Adaptability of Child or Other User's Ability to Make Requests

In some embodiments, as the restrictions are created via software, and are modifiable by altering selections made, a child or other user can preferably submit requests to have certain restrictions modified, temporarily relaxed or the like. For example, in some embodiments, a child can submit a request to call a particular person for a limited time period. As another example, in some embodiments, a child can submit a request to have a particular person added to an approved callee and/or caller list (i.e., approved person that the child can call and/or that can call the child).

By way of example, in some embodiments, child can:

1. Enter numbers into fields and submit for parent approval (such as, e.g., the following fields).

Number

Name

Description (e.g., friend)

2. Enter number to dial and have message transmitted automatically via text message for parent approval before passing thru call.
3. Create address book on phone—with some numbers able to be called and with some numbers not (based on parent approval).

Adaptability and Variability of Restrictions

According to the preferred embodiments, the MOBILEFREELY application is configured in a manner to allow a user to modify and vary the restrictions as needed. For example, when a small child first uses the phone, a parent might desire that the phone have only one dialing key which will direct calls to a single parent. Similarly, a parent might desire that the phone only receive calls from one present telephone number. Then, over time, the parent might slowly increase the phones abilities, by, e.g., including a second telephone number to be called. Then, over time, the parent might again slowly increase the phones abilities, by, e.g., including a third telephone number to be called, as so on.

In particular, in the preferred embodiments, a parent or other administrator of the MOBILEFREELY application will be presented with a user interface enabling entry and selection of desired capabilities, etc. In some embodiments, an administrative screen can be presented on the phone itself (e.g., upon entry of a user name and password or the like). And, in other embodiments, the parent can enter such information remotely into a web site, such as, e.g., at MOBILEFREELY.com, which web site would have a password protected form via which the parent can enter and/or modify selections, which selections would be used to remotely modify functionality of the mobile phone (e.g., such as, e.g., having communication which such functionality data transmitted to the child's phone through a backend server or the like).

For example, in some embodiments, parents can:
1. Also select time restrictions for calls, such as, e.g.:
  a. Friends, not during school, not late at night;
2. Input various control feature selections (such as, e.g., described below).

In some embodiments, as described above, the MOBILEFREELY application software can present a parent or other administrator with a graphical user interface having certain menus or screens within which the parent or administrator can select various levels and degrees of control functionality.

By way of example, in some embodiments, a parent can be presented with a selection to control whether a screen will be locked when the MOBILEFREELY software is run (such as, e.g., shown in the illustrative screen at SCREEN DISPLAY 1 below (see FIG. 6 which depicts various screen displays according to some embodiments).

By way of example, in some embodiments, a parent can be presented with a selection to control the number of Callees (i.e., by entering a desired number) when the MOBILEFREELY software is run (such as, e.g., shown in the illustrative screen at SCREEN DISPLAY 2 below. As shown in this example, upon entering the number 1, a user can be presented with fields to enter other data, such as, e.g., name (and whether name is displayed to the user), number (and whether number is displayed to the user) and also means to upload a photo (and whether photo is displayed to the user). Preferably, upon clicking displayed, the device will be configured to switch between a display and non-display mode, such that an administrator in this example is having these items displayed, but can modify that by clicking display on one or more of these items to have such not displayed. Preferably, upon clicking photo, the interface will run a routine that will a) present a directory or enable the administrator to otherwise enter a selection or link to a photo within the devices memory.

In some embodiments, an administrator can enter a list of potential callees, but can "activate" or enable such callees, such as, e.g., by clicking on the callee name to show it in bold and/or by otherwise clicking a field to enable such a callee. In that manner, an administrator can readily update/modify/change callees as desired without having to reenter information. In addition, in some embodiments, if a user enters a request to call or be enabled to call a new callee, such a new callee can appear in the list as non-enabled, but with a highlight, start, message or other color indicating that a request for approval has been submitted by the user.

In some embodiments, an administrator can also specifically identify a list of emergency callees that can be contacted, such as, e.g., shown in SCREEN DISPLAY 3. In some examples, an administrator can choose to forgo any emergency calling (such as, e.g., to avoid a child inadvertently calling an emergency number, such as, e.g., 911), and/or can insert other numbers as emergency numbers. In some embodiments, as discussed below, dialing of emergency numbers can require special entry steps to ensure avoiding inadvertent dialing, such as, e.g., by typing a code, and/or by touching a sequence of displayed dots or numbers or the like on the display screen. In some examples, the administrator can input a required code for the user to achieve such an emergency code, as shown.

In some embodiments, such as, e.g., shown in SCREEN DISPLAY 4, an administrator can enter a list of potential callers (i.e., that can call the phone), but can "activate" or enable such callers, such as, e.g., by clicking on the caller name to show it in bold and/or by otherwise clicking a field to enable such a caller. In that manner, an administrator can readily update/modify/change callers as desired without having to reenter information. In addition, in some embodiments, if a user enters a request to call or be enabled to call a new caller, such a new caller can appear in the list as non-enabled, but with a highlight, start, message or other color indicating that a request for approval has been submitted by the user.

In some embodiments, as described in the '916 application, a caller can be enabled to automatically have the caller's call answered, even without action by the user/child. In some embodiments, this functionality is enabled by the administrator such as, e.g., by selecting enable as shown in the graphical user interface shown in SCREEN DISPLAY 4.

In some embodiments, as shown below in SCREEN DISPLAY 5, an administrator can also restrict the manner or usage of the phone in terms of telephone functionality, such as, e.g., whether the phone is enabled to make and/or to receive common cellular telephone calls (e.g., using a cellular service provider), whether the phone is enabled to make internet calls (e.g., using SKYPE, etc.), whether the phone is enabled to make and/or receive other specific call types, such as, e.g., VONAGE, etc. Among other things, this can help to limit costs of usage, such as, e.g., if the child phone is restricted to SKYPE or the like usage wherein minutes of usage would not affect pricing and/or are perhaps free. In such a case where the phone can only make calls to a few numbers and/or receive calls only from a few numbers, limiting services will have very small impact in most scenarios (e.g., as long as one knows that the service will work with the limited numbers).

In some embodiments, the MOBILEFREELY application can present a GUI (graphical user interface) as shown in SCREEN DISPLAY 6 to an administrator that will enable the administrator to do administrative tasks either remotely (such as, e.g., via a web site such as MOBILEFREELY.com, via a password protected user page) and/or via another mobile phone (such as, e.g., via another iPhone or the like running a similar MOBILEFREELY application that can communicate with the child/user's phone via a cellular network and/or via the Internet or the like.

In some embodiments, as described in the '916 application, a caller can be enabled to automatically have the caller's call answered even without action by the user/child. In some embodiments, this functionality is enabled by the administrator such as, e.g., by selecting enable as shown in the graphical user interface shown in SCREEN DISPLAY 7. Among other things, this feature can enable a guardian or the like to contact the child without the child having to understand the operation of the telephone. Note: as discussed above, this functionality can also be achieved or enabled via other screens, such as, e.g., via a SCREEN DISPLAY 4 features as discussed above.

In some embodiments, as shown in SCREEN DISPLAY 8, an administrator can be enabled to remotely turn on and/or off the child/user's telephone. Among other things, this can help to maintain battery life and/or restrict child/users activities. In some embodiments, the child/user phone will not be turned fully off, in order to enable receiving of audio signals by the administrator, but upon being turned off, it will cut all activities other than listening passively for audio communications from the administrator upon being turned off (e.g., by the administrator).

In some embodiments, as shown in SCREEN DISPLAY 9, an administrator can be presented with a screen selection to enable the remote changing of callees. For example, in some embodiments, in order to ensure that a child's phone is not tampered with remotely, changing of callee or caller telephone numbers remotely (e.g., via a web site such as, e.g., MOBILEFREELY.com and/or another telephone) can be disabled. While, in other cases, it can be enabled with such a screen GUI.

In some embodiments, as described in the '916 application, a caller can be enabled to automatically have the caller's call answered in such a manner to provide an audio only output from the user's phone (i.e., without communication between the phones), even without action by the user/child. In some embodiments, this functionality is enabled by the administrator such as, e.g., by selecting enable as shown in the graphical user interface shown in SCREEN DISPLAY 10. Among other things, this feature can enable a guardian or the like to monitor a child/user unobstructively.

In some embodiments, as described in the '916 application, a caller can be enabled to automatically have the caller's call answered in such a manner to provide a video only output from the user's phone (i.e., without communication between the phones), even without action by the user/child. In some embodiments, this functionality is enabled by the administrator such as, e.g., by selecting enable as shown in the graphical user interface shown in SCREEN DISPLAY 11. Among other things, this feature can enable a guardian or the like to monitor a child/user unobstructively.

In some embodiments, as described in the '916 application, a caller can be enabled to automatically have the caller's call answered in such a manner to provide a photo only output from the user's phone (i.e., without communication between the phones), even without action by the user/child. In some embodiments, this functionality is enabled by the administrator such as, e.g., by selecting enable as shown in the graphical user interface shown in SCREEN DISPLAY 12. Among other things, this feature can enable a guardian or the like to monitor a child/user unobstructively.

With reference to the page labeled SCREEN SAMPLES below, these show illustrative graphical user interface screen displays that can be created using the MOBILEFREELY application software in accordance with some embodiments. In some embodiments, these screens will be adapted based on the inputs (discussed above) of the administrator.

For example, the top left screen shows an illustrative example in which a single callee is shown for the user/child. Here, there is only one active icon shown that will direct a call to the father, and, here, the father's image and name (DAD) is displayed for the child (i.e., the telephone number is not displayed). Among other things, as the father's telephone number can be modified and/or varied, this will avoid confusion to the user who will not see the telephone number.

As another example, the bottom left screen shows an illustrative example in which two callees are shown for the user/child. Here, there are only two active con shown that will direct a call to the father and mother, respectively, and, here, the father's and mother's images and names (DAD and MOM) are displayed for the child (i.e., the telephone number is not displayed). Among other things, as the father's and mother's telephone number can be modified and/or varied, this will avoid confusion to the user who will not see the telephone number.

As another example, the top right screen shows an illustrative example in which a plurality of callees are shown for the user/child (including emergency callees). Here, rather than displaying icons that are adapted to provide a GUI interface that a user can select (as in the two preceding examples), the display is adapted to provide a list of numbers. This list can preferably operate in a similar manner to icons above, in that a user can select (e.g., click on a number in the list such as, e.g., tactilely with ones fingers) to initiate a call to such number. Among other things, such a list type display can be used for older children that desire a more mature phone screen with full call details, etc.

In preferred embodiments, the MOBILEFREELY application software can present the administrator with another SCREEN DISPLAY selection which will enable the administrator to select the type of button display, such as, e.g., a) ICONS similar to the first two examples above (in which simulated keys or buttons are presented on the touch screen for a user to press), b) TEXTUAL LISTING similar to the latter example above, and/or c) other arrangements (which can include combinations of such features, such as, e.g., MOM and DAD having ICONS and other callees in a list or the like).

With reference to the bottom right screen, this screen shows an illustrative display that can be presented upon a child/user's clicking of an emergency number to call, such as, e.g., 911. That is, to avoid inadvertent dialing of an emergency call, preferably, another step is required to allow the call to pass through. For example, a child might be required to type a code (i.e., in such cases, the device may include a key board and/or the touch screen can display necessary icons for the child to select from, such as, e.g., a list of numbers 0-5 or the like). In some embodiments, the device can merely present a few boxes that the user would press in succession to enable passing through the call. For example, in this picture a box is shown at the left and right sides. In some embodiments, the child will just need to press the first box and then the second box. In some embodiments, the boxes can even include numbers 1 and 2 to assist in performing such an order of pressing. In some embodiments, three or more boxes can be presented to ensure that the number is not accidentally called. In this manner, emergency calling can be enabled, and adapted to still be easy for a child user without rendering inadvertent calls to emergency numbers. Once again, in preferred embodiments, the administrator can be presented with a screen enabling the administrator to adapt the method as needed, such as, e.g., selecting the number of icons to be pressed, the specific code to be entered or the like, such as, e.g., to ensure the ease of use, etc., based on the child/user's maturity, needs, etc.

Illustrative Architectures and Systems

Figure 2:
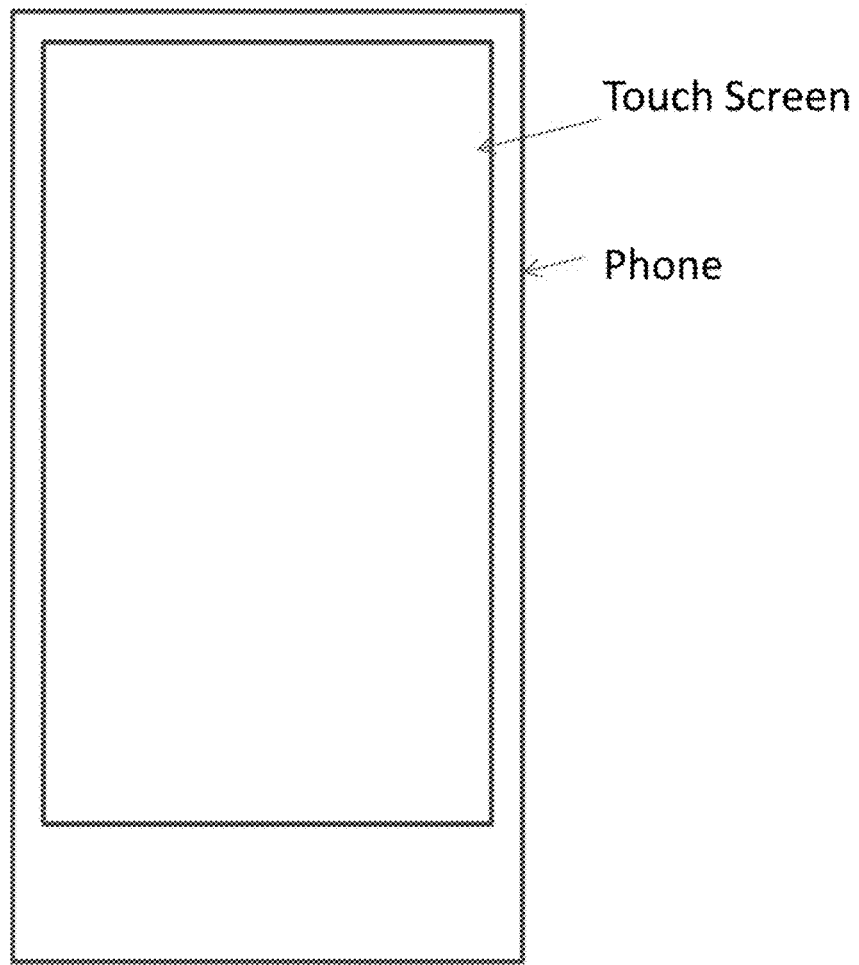
FIG. 2 depicts an illustrative child/user phone according to some illustrative embodiments depicting a phone having a large touch interface.

For illustrative purposes, FIG. 2 depicts an illustrative child/user phone according to some illustrative embodiments depicting a phone having a large touch interface. In the preferred embodiments, the phone does not include manual or physical keys (e.g., mechanically moved keys) but includes a touch screen interface similar to, e.g., an iPhone or the like. In that regard, see also the Wikipedia iPhone description part of this application.

Figure 3:
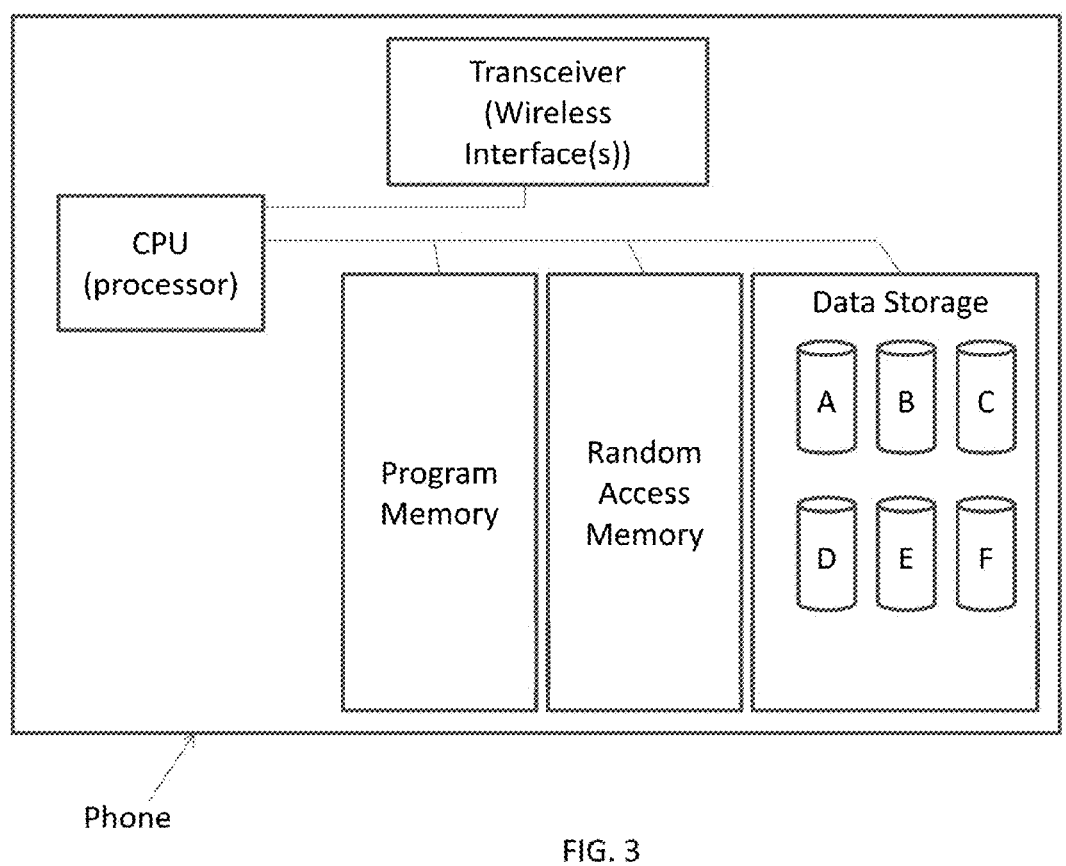
FIG. 3 depicts some illustrative components of such an illustrative child/user phone in some embodiments, including, e.g., a CPU or processor, wireless transceiver(s) (e.g., for cellular and/or non-cellular communications), random access memory, program memory (e.g., for containing operating systems, MOBILEFREELY software, and/or other program software), and digital data storage.

Also for illustrative purposes, FIG. 3 depicts some illustrative components of such an illustrative child/user phone in some embodiments, including, e.g., a CPU or processor, wireless transceiver(s) (e.g., for cellular and/or non-Page cellular communications), random access memory, program memory (e.g., for containing operating systems, MOBILE-FREELY software, and/or other program software), and digital data storage. In the illustrative example, the digital data storage is shown as including different storage sets, including, e.g., storage sets A-F (as just some illustrative non-limiting examples). By way of example, such storage sets can include, e.g., device storage such as, e.g.:

1. Administrator selection data (e.g., which can include data entered by the administrator for modifying the child/user phone as described);
2. Child/User data (e.g., which can include data entered by the child user, such as, e.g., address information, notes, and/or other items);
3. Video data (e.g., which can include stored video data obtained via the child/user phone device);
4. Photo data (e.g., which can include stored photo data obtained via the child/user phone device);
5. Audio data (e.g., which can include stored photo data obtained via the child/user phone device).
6. Other data as would be appreciated by those in the art based on the embodiments described herein.

In some illustrative embodiments, a flow diagram for processing caller telephone calls to the child/user device is shown in FIG. 1. As shown, a call can be directed to the user device. Upon receiving the call, the device can compare the incoming call telephone number (e.g., employing known caller ID functionality to identify the number) to an approved caller log in the database. If the number matches the administrator selections, the call can be passed through. Otherwise, the call can be declined. Upon passing through the call, the system can check the database rules for further functions, such as, e.g., based on administrator selection. For example, in some embodiments, the administrator can program the phone to a) automatically answer (in which case the call would be directly passed through and perhaps with a few rings or an alarm to notify the child, or perhaps t automatically present the call via a loud speaker), b) pass on the phone (with a modified caller display based on user selection), c) to cause the child phone to download and send an audio, video and/or photo, d) and/or to perform other operations as detailed herein.

In making an outgoing call, the child/user preferably is only able to select pre-designated to pre-provided icons or numbers, such that a comparison to an allowed phone log is not required. However, in some embodiments, a child/user can be enabled to have a full phone keyboard (e.g., with inputs 0-9) via which a child user can enter requested numbers to call (e.g., which can be transmitted the administrator and/or saved on the child phone for the administrator to later approve), and prior to passing through outgoing calls, the entered number can be compared to the administrator approved list.

Wireless Networks

Child/user mobile devices of the present invention are, as set forth above, wireless devices that communicate via wireless networks to other remote devices, such as, e.g., via cellular and non-cellular networks.

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., BLUETOOTH™, IEEE 802.11, and HomeRF.

By way of example, BLUETOOTH™ products may be used to provide links between mobile computers, mobile phones, portable handheld devices, personal digital assistants (PDAs), and other mobile devices and connectivity to the Internet. BLUETOOTH™ is a computing and telecommunications industry specification that details how mobile devices can easily interconnect with each other and with non-mobile devices using a short-range wireless connection. BLUETOOTH™ creates a digital wireless protocol to address end-user problems arising from the proliferation of various mobile devices that need to keep data synchronized and consistent from one device to another, thereby allowing equipment from different vendors to work seamlessly together. BLUETOOTH™ devices may be named according to a common naming concept. For example, a BLUETOOTH™ device may possess a BLUETOOTH™ Device Name (BDN) or a name associated with a unique BLUETOOTH™ Device Address (BDA). BLUETOOTH™ devices may also participate in an Internet Protocol (IP) network. If a BLUETOOTH™ device functions on an IP network, it may be provided with an IP address and an IP (network) name. Thus, a BLUETOOTH™ Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Figure 4:
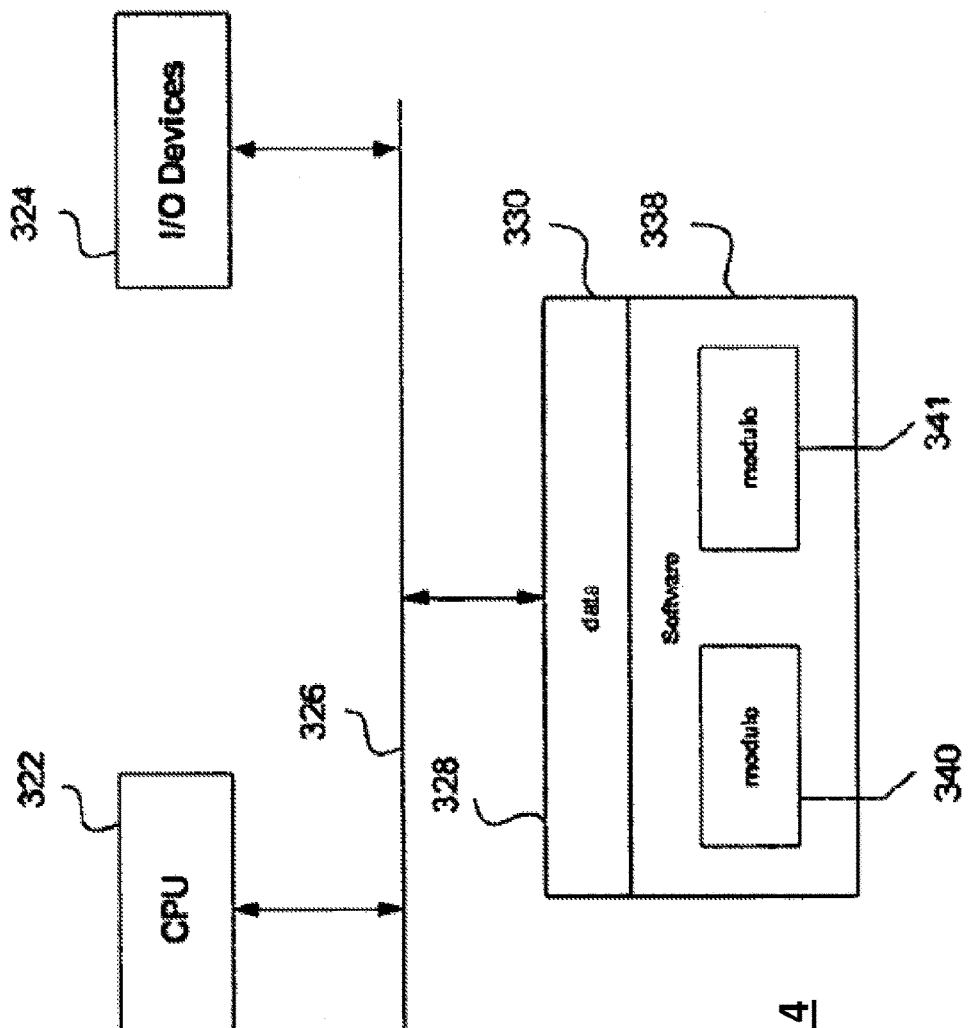
FIG. 4 shows an illustrative computer or control unit that can be used to implement computerized process steps, to be carried out by devices, such as, e.g., a mobile device (e.g., a child/user mobile phone of the present invention can employ computer control functionality as detailed below in some embodiments) and also an access point, another mobile device, a source node or destination node in some embodiments.

FIG. 4 shows an illustrative computer or control unit that can be used to implement computerized process steps, to be carried out by devices, such as, e.g., a mobile device (e.g., a child/user mobile phone of the present invention can employ computer control functionality as detailed below in some embodiments) and also an access point, another mobile device, a source node or destination node in some embodiments. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

Figure 5:
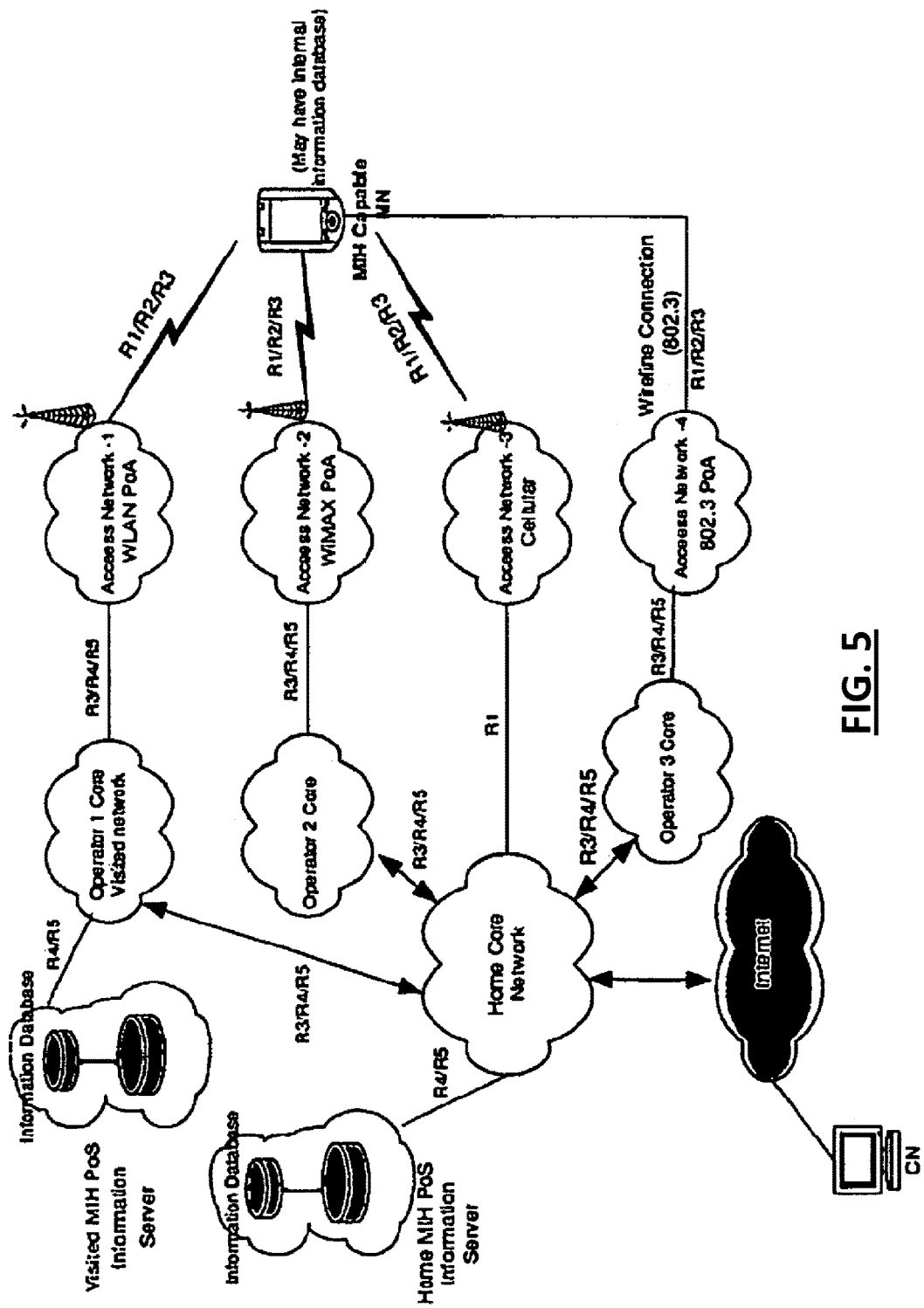
FIG. 5 shows an illustrative architectural diagram with an illustrative cellular phone or mobile node (MN, far right) which can have features of a child/user phone of the present invention that supports multiple wired and wireless access technology options.
Figure 6D:
FIG. 6 shows various screen displays according to some illustrative embodiments.
Figure 6D:
Figures 6E, 6F, 6G, 6H, 6I:
Figure 6M:
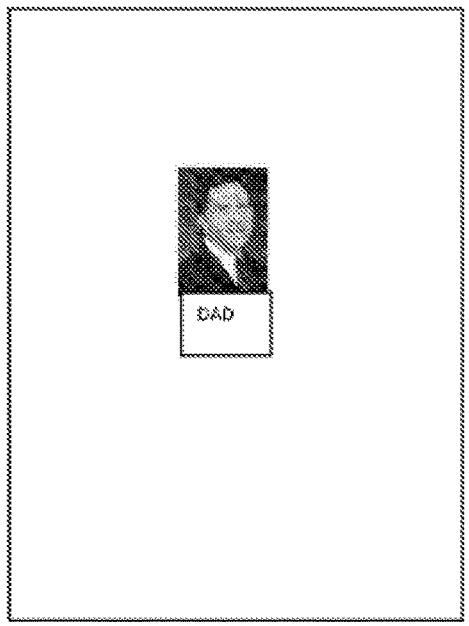
Figure 6M:
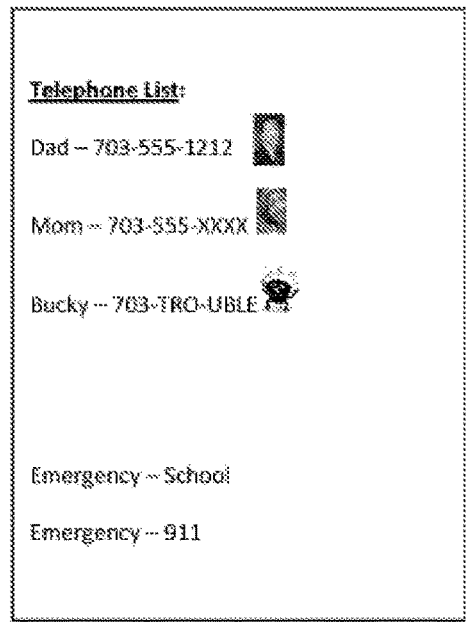
Figure 6M:
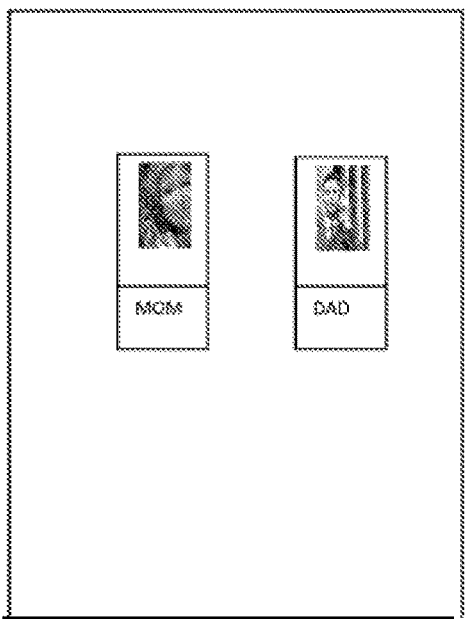
Figure 6M:
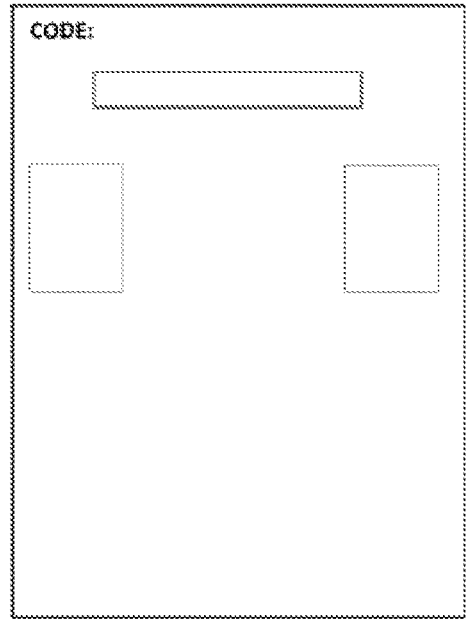

FIG. 5 shows an illustrative architectural diagram with an illustrative cellular phone or mobile node (MN, far right) which can have features of a child/user phone of the present invention that supports multiple wired and wireless access technology options. The model assumes that the provisioning service provider either operates multiple access technologies or allows its user to roam into other networks when SLA in support of inter-working has been established. The MN has an MIHF implemented, which enables it to send specific MIH queries. The MN may have the information service partially implemented internally.

The model illustrates access networks that are connected in some loose, serial way to a core network (Operator 1-3 Core). Also depicted is an access network that is more tightly interworked or coupled (Access Network-3) The Operator 1-3 Core each might represent a service provider, corporate intranet provider or just another part of the visited or home access, or even core network. In this model the provisioning provider is operating Access Network-3 coupled via R1 to a core (labeled Visited/Home Core Network). The terms Visited and Home are used to indicate the provisioning service provider or enterprise. Any of the illustrated networks could be both a visited or home network depending on the relation of the operator to the provisioner of the MN.

In some embodiments, a child/user mobile device (e.g., cellular phone) can be adapted to have functionality of the present invention employing software, hardware and/or firmware. Moreover, in some embodiments, a computer readable medium (e.g., DVD, hard drive, and/or any other known medium) can include software thereon adapted to cause a mobile device (e.g., cellular phone) to perform functionality of a child/user phone of the preferred embodiments. In some examples, such software can be stored by a service provider in a database and downloaded via the Internet directly to the child/user phone or to a desktop PC to which the child/user phone can connect or dock to download such software (such as, e.g., as with conventional iPhone and the like $3^{rd}$ party application software). By way of example, in some embodiments, a user can log on to a web site, such as, e.g., MOBILEFREELY.com and download such MOBILEFREELY software to impart such functionality to the mobile device.

Mobilewisely™ Embodiments

In some embodiments, an application is provided for a mobile device which includes:
  a) Ability to restrict use of applications by, e.g.:
    a. Selecting Applications that are restricted completely (for certain users);
    b. Selecting Hours and/or Times of Usage (for certain users);
      i. Such as, e.g., not in time period, such as, e.g., between 8-3:30 pm daily (e.g., during school hours) and/or such as, e.g., only used on weekends or on Tuesday evenings and/or the like;
      ii. Such as, e.g., used for only a certain time extent within a given time frame, such as, e.g., used less than 30 minutes per day;
      iii. Such as, e.g., used only a certain number of times per time period, such as, e.g., 5 times per day and/or 3 days per week (or the like);
    c. Selecting combined restrictions and/or
    d. Other restrictions.
In some embodiments, the device can be configured so as to:
  a. Immediately stop operation of an application such as, e.g., a computer game upon reaching of a restriction (such as, e.g., discontinuing a game upon reaching a 30 minutes within a given time period) or to stop operation of a game upon reaching of a particular hour (e.g., upon time hitting 8:30 am (such as, e.g., during school hours) or upon hitting 9:00 pm (such as, e.g., during sleep hours). For example, such a device can perhaps be used for a child to read at night, and such can be restricted to turn off at bed time. As another related example, a device can be used by a child and perhaps restrictions can be set such that during sleep hours, a child can only
    a) read a book (e.g., an ebook). In some embodiments, the device can also have an alarm application that is set to enable the child to awaken with the book. In some embodiments, upon awakening other, helpful applications, are enabled, such as, e.g., a calendar or schedule application, and/or a school application or the like to enable the child to plan and act accordingly. In some embodiments, a night time a child is preferably enabled to also view a calendar schedule to enable the child to remind themselves of next day activities and scheduling before sleeping (i.e., helping to maintain clear planning and organization of thought before sleeping).
  b. Provide warnings as to how much time remains (e.g., red clock in top right) and/or notice before starting a game.
  c. Enable a user to continue use of an application if started before time restriction until application terminates but not to restart. For example, enabling a user to finish a game (e.g., so as to not upset a child by interrupting in the middle of an activity).
  d. Enable a user to save a game in the middle and complete the game or other activity at a later time when the restrictions are released, such as, e.g., not to force the child to lose whatever the child was in the middle of doing.
  e. Enable a child/user to select a) save for later (if they desire to continue upon restriction coming into effect or b) exit (if they desire to merely exit and not save activity for later).

In some embodiments, such MOBILEWISELY application is administered by a parent and/or other guardian such that a child and/or other user's use of the phone or other mobile device (such as, e.g., an iPhone (e.g., a wireless communication device, such as, e.g., cellular and/or non-cellular) and/or iPad (e.g., a tablet device or lap top computer device). In some embodiments, a touch screen user interface is provided to enable administration and use.

In some embodiments, a web site, such as, e.g., MOBILEWISELY.com is provided for providing applications to download and/or recommendations for application use and/or restrictions, and/or MOBILEWISELY application software to download and/or a community chatroom or comment board for users to post and discuss desirable APPS and restrictions for users (e.g., to get and give feedback from/to others in the community to help with developing restrictions, etc.).

In some embodiments, this enables adaptable restrictions that can, e.g., be lifted over time.

In some embodiments, e.g., a child can be freely able to use mind enhancing applications (e.g., math games, etc.) and/or healthy applications (e.g., applications that may exercise eyes so as to improve sight in contrast to most games, such as, e.g., applications that relax the eyes and change vision to far field vision focus). In some embodiments, for good eye health, such an application can perhaps be required to be used every certain number of time periods within a time period (such as, e.g., 5 minutes every 30 minutes of use or the like). In some embodiments, such an app can even interrupt (e.g., pause a game) to require use to relax eyes or the like.

In some embodiments, a GPS device can be included in the mobile device and a MOBILESAFELY™ application can be provided which will provide warnings to the user of the device if:
  a) The user strays too far from another individual (such as, e.g., if a child in a mall strays from the parents—i.e., in which case the device may compare GPS coordinates of the child as compared to a designated location and/or as compared to a GPS coordinate of another device carried by the parents and/or the like).
b) The user is near a dangerous individual, such as, e.g. a sex offender (e.g., if such persons are required to have wireless devices and/or other mechanisms to identify their locations) and/or a sex offender's home address (e.g., by comparing registered names/addresses with map software, such as, e.g., google maps or the like).
c) If the child is too close to a road or highway and/or in some geographical hazard and/or area that is disapproved by a parent.
d) If the child is too close to another individual that has a particular legal or other restriction imposed (e.g., if both have a similar MOBILESAFELY application (e.g., by court and/or by parents—e.g., if two parents decide to require their children to separate for a time period, such as, e.g., children that are going to parties at night or misbehaving during the day). This could also be provided by schools and/or businesses in order to restrict interactions between some students, employees and/or the like.

In some embodiments, such a warning may be presented to the child via that phone. In other embodiments, such warning may be remotely directed to an administrative user, such as, e.g., to a parent or guardian via another mobile device such as, e.g., via a cellular telephone communication or alarm and/or via a computer through the internet or the like.

Other Exemplary Embodiments

In some embodiments, a MOBILEFREELY application can be implemented within, e.g., an iPhone and/or another phone in the following manner:
1. The phone can include a touch screen and also a device lock function. The device lock function can be, e.g., a requirement that the user input a code, such as, e.g., a password before allowing access to the functions of the device. Such device lock functions are common with many devices, such as, e.g., iPhones, Blackberry devices, etc.
2. In addition, it is known to allow a user to make an emergency call to 911 without entering the password to access the device in such phones. Moreover, it is also known to allow a call to pass thru from a caller without requiring the user to enter the unlock code to user the features of the phone (i.e., to enable a user to timely answer a call).
3. As such, the present invention can be implemented within such known phones by providing some modifications to the existing systems which enable some 'actions' to be taken prior to gaining access to the device. For example, in some embodiments, an application can be provided that enables a user of the device to select Callees that can be contacted via a screen presented prior to unlocking of the full device functionality with said password. Accordingly, prior to unlocking, the user can be presented with a screen that can include one or more keys as per embodiments described related to said MOBILEFREELY examples, that include, e.g., keys for calling certain callees.
4. Moreover, as a locked device is already configured to allow calls to pass thru, in some embodiments, the application can be configured such as to only allow certain calls to be passed thru when the device is in a locked state. In particular, to only allow certain callers to call the phone in such a locked state, such as, e.g., by inputting caller numbers as per the description related to other MOBILEFREELY application embodiments. In some embodiments, the callers that can be passed thru in a locked state can be modified by the administrator of the phone, such as, e.g., selecting via a user interface that a) ALL calls to pass THRU or b) SPECIFIED calls are to pass THRU (as, e.g., per entry into an interface as described in said MOBILEFREELY embodiments.

Among other things, this latter can, thus, be very easy to implement, and allows a novel method of upgrading an existing phone that already has device lock functionality with a very easy to implement modification—e.g., 1) modifying a preliminary GUI screen prior to unlocking the device to include, e.g., dialing keys (such as, e.g., mommy and daddy keys) and 2) modifying the device to only allow certain calls to pass thru in some embodiments. In some embodiments, the GUI screen prior to unlocking can also include an icon for entry of a password. While this could add another key or icon or the like (such as, e.g., ENTER PASSWORD icon) which may complicate the screen slightly, this should not add substantial confusion to a child user. Moreover, upon entering an incorrect password, the device can preferably merely redisplay the main GUI in some embodiments. In some embodiments, a device is caused to more significantly lock (i.e., not allow entry of a correct password) if an incorrect password is entered multiple times. Here, if desired, the number of incorrect entries can be increased to a high number (e.g., over 50 or more) or can be eliminated such that a child cannot inadvertently lock the device by entering incorrect passwords. However, in some other embodiments, a password can be entered in a more complex manner, such as, e.g., only presenting a screen to allow entry of a password upon some pressing of a unique combination of side buttons on the device, or upon pressing of some unique regions of the preliminary GUI screen which the child user is unaware of (such as, e.g., touching certain spots on the screen in succession).

In some preferred embodiments, MOBILEFREELY applications and/or other applications described in this application are implemented within an ANDROID mobile device. Among other things, as MICROSOFT has substantial hurdles for approval of mobile applications, the ANDROID can create a better environment for such applications. Among other things, as the MOBILEFREELY application will impact the viewing of the phone (i.e., even within a basic log-on state), such may be best suited for an environment in which allowed applications are not substantially restricted.

Broad Scope of the Invention

While illustrative embodiments of the invention are set forth and described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is nonexclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A wireless child phone, comprising:
   a) a handheld phone unit with a touch screen type user interface;
   b) said wireless child phone being configured to make calls to only a preset set of callees selected by an administrator, and wherein said wireless child phone is adaptable to modify said preset set of callees by the administrator to present a modified user interface for a user based on the number of callees selected by the administrator in said preset set of callees;
   c) said wireless child phone being configured to display on said touch screen dialing keys corresponding to said set of callees selected by said administrator comprising icons or regions for enabling a call to be automatically directed to a callee upon selecting a respective icon or region, wherein said wireless child phone is configured such that upon pressing a respective icon or region, a call is automatically directed to a respective one of said preset set of callees; and
   wherein said child phone is configured to vary positions of said dialing keys displayed such that the positions of said dialing keys displayed varies based on the number of callees selected by said administrator.

2. The wireless child phone of claim 1, wherein said icons or regions include images of callees and/or other designations of callees.

3. The wireless child phone of claim 1, wherein said wireless child phone is configured to enable the administrator to select any desired number of callees within a range between 1 to 9, and said wireless child phone is configured to display a corresponding number of dialing keys for the user.

4. The wireless child phone of claim 1, wherein said wireless child phone is further configured to enable the administrator to select a manner of display of said dialing keys;

5. The wireless child phone of claim 4, wherein said wireless child phone is further configured to enable the administrator to select said manner of display to include images or text.

6. The wireless child phone of claim 1, wherein said wireless child phone is configured such that the number of callees selected by the administrator is a finite number of three or more, and wherein selected callee are displayable on said wireless child phone.

7. The wireless child phone of claim 1, wherein said wireless child phone is configured to receive calls from only a preset set of individuals.

8. The wireless child phone of claim 1, wherein said wireless child phone includes a common key pad with dialing keys.

9. The wireless child phone of claim 1, wherein said icons or regions include text and/or visual designating a mother and a father.

10. A non-transitory computer readable medium having software configured to cause a wireless child phone to perform the functionality set forth above in claim 1.

11. A method of having a child communicate with a parent or other entity, comprising:
   providing a child with a handheld wireless child phone according to claim 1;
   causing said wireless child phone to only achieve outgoing telephone calls to a preset set of callees selected by the administrator and to display a modified number of dialing keys for a child user based upon the number of callees selected by the administrator; and
   causing said wireless child phone to automatically direct a call to at least one callee upon the child selecting a corresponding icon or region related to such callee.

12. The method of claim 11, further including remotely changing a telephone number for at least one of said callees.

13. The method of claim 11, further including remotely changing the telephone number for said at least one of said callees remotely via the Internet.

14. The method of claim 11, further including remotely changing a telephone number for at least one of said allowed callers remotely via the Internet.

15. The method of claim 11, including having a child use said wireless child phone so as to selectively call the child's mother or father and so as to selectively call said preset other callee identified by the parent.

16. The method of claim 11, further including causing said wireless child phone to only achieve incoming telephone calls from a preset set of allowed callers, including the mother and/or the father of the child and including a set of other callers selected by the parent of the child user.

17. The method of claim 11, further including configuring said wireless child phone to connect to the Internet via browser software and limiting site access to a number of preset URLs and/or Web Sites.

18. The method of claim 11, further including limiting email communications to send email communications to only a preset set of individuals and/or to receive email communications from only a preset set of individuals.

19. A wireless child phone, comprising:
   a) a handheld phone unit with a touch screen type user interface;
   b) said wireless child phone being configured to make calls to only a preset set of callees, and wherein said wireless child phone is configured to receive an input by an administrator of the number of callees to be displayed to a user on said touch screen type user interface;
   c) said child phone being configured to present a modified user interface for a user based on said number of callees input by said administrator including to display on said touch screen dialing keys comprising icons or regions enabling a call to be automatically directed to callees upon selecting a respective said icon or region, and to modify the number of said icons or regions displayed based on said number of callees input by said administrator, and wherein said child phone is configured such that upon pressing a respective said icon or region a call is automatically directed to a respective one of said preset set of callees;

whereby the number of dialing keys displayed on said wireless child phone to a user of said wireless child phone can be selected and modified by an administrator of said wireless child phone to enable varying of the number of dialing keys by the administrator; and wherein said child phone is further configured to vary positions of said icons or regions displayed to a user on said touch screen type user interface, such that the positions of said icons or regions displayed varies based on the number of callees input by said administrator.

* * * * *